(12) United States Patent
Reuther et al.

(10) Patent No.: US 9,733,860 B2
(45) Date of Patent: *Aug. 15, 2017

(54) COMBINED LIVE MIGRATION AND STORAGE MIGRATION USING FILE SHARES AND MIRRORING

(71) Applicant: Microsoft Corporation, Redmond, WA (US)

(72) Inventors: Lars Reuther, Kirkland, WA (US); Sergey Dmitriyevich Meshcheryakov, Redmond, WA (US); Chris Eck, Sammamish, WA (US); Rajesh Dave, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

This patent is subject to a terminal disclaimer.

(21) Appl. No.: 13/925,752

(22) Filed: Jun. 24, 2013

(65) Prior Publication Data

US 2013/0290661 A1    Oct. 31, 2013

Related U.S. Application Data

(63) Continuation of application No. 13/177,432, filed on Jul. 6, 2011, now Pat. No. 8,490,092.

(51) Int. Cl.
*G06F 9/455* (2006.01)
*G06F 3/06* (2006.01)

(52) U.S. Cl.
CPC ........ *G06F 3/0647* (2013.01); *G06F 9/45558* (2013.01); *G06F 2009/4557* (2013.01)

(58) Field of Classification Search
None
See application file for complete search history.

(56) References Cited

U.S. PATENT DOCUMENTS 6,065,018 A   5/2000   Beier et al.
6,594,698 B1  7/2003   Chow
(Continued)

FOREIGN PATENT DOCUMENTS

EP    2309387 A    4/2011

OTHER PUBLICATIONS

"International Search Report", Mailing Date: Jan. 25, 2013, Application No. PCT/US2012/045774, Filed Date: Jul. 6, 2012, pp. 11.
(Continued)

*Primary Examiner* — Van Nguyen
(74) *Attorney, Agent, or Firm* — Davin Chin; Chin IP, PLLC (57) ABSTRACT

Migration of a virtual machine and associated files to a destination host may be performed. A source host may initiate establishment of a temporary network file share at a destination location of the destination host to provide the source host and the destination host with access to the file share. While the virtual machine is running at the source host, a storage migration and a live migration may be initiated. Using the network file share, the source host may copy the associated files to the destination location. A runtime state of the virtual machine may be copied to the destination host. In a final phase of the migration, the virtual machine at the source host may be stopped, the storage migration may be completed, the copying of the runtime state may be completed, and the virtual machine may be started at the destination host.

20 Claims, 7 Drawing Sheets

(56) References Cited

U.S. PATENT DOCUMENTS

| | | |
|---|---|---|
| 6,678,809 B1 | 1/2004 | Delaney et al. |
| 6,711,632 B1 | 3/2004 | Chow et al. |
| 7,174,379 B2 | 2/2007 | Agarwal et al. |
| 7,203,944 B1* | 4/2007 | van Rietschote et al. .... 718/104 |
| 7,219,262 B2 | 5/2007 | Miller et al. |
| 7,257,811 B2* | 8/2007 | Hunt et al. .......... 718/1 |
| 7,383,405 B2* | 6/2008 | Vega et al. .......... 711/162 |
| 7,484,208 B1* | 1/2009 | Nelson .......... 718/1 |
| 7,509,351 B2 | 3/2009 | Lomet et al. |
| 7,600,087 B2 | 10/2009 | Yamagami |
| 7,707,372 B1 | 4/2010 | Kumar et al. |
| 7,716,667 B2* | 5/2010 | van Rietschote et al. .......... 718/1 |
| 7,761,573 B2* | 7/2010 | Travostino et al. .......... 709/226 |
| 7,788,521 B1 | 8/2010 | Sim-Tang |
| 7,788,665 B2* | 8/2010 | Oshins .......... 718/1 |
| 7,890,461 B2 | 2/2011 | Oeda et al. |
| 7,900,005 B2 | 3/2011 | Kotsovinos et al. |
| 7,925,622 B2 | 4/2011 | Chapman |
| 7,996,484 B2 | 8/2011 | Mundkur et al. |
| 8,117,410 B2 | 2/2012 | Lu et al. |
| 8,131,723 B2 | 3/2012 | Sim-Tang |
| 8,150,971 B2 | 4/2012 | Lublin et al. |
| 8,234,518 B2 | 7/2012 | Hansen |
| 8,332,689 B2* | 12/2012 | Timashev et al. .......... 714/15 |
| 8,332,848 B2* | 12/2012 | Azulay et al. .......... 718/1 |
| 8,335,902 B1 | 12/2012 | Feathergill |
| 8,359,593 B2 | 1/2013 | Golosovker et al. |
| 8,370,832 B2* | 2/2013 | White .......... 718/1 |
| 8,380,669 B2 | 2/2013 | Groethe et al. |
| 8,458,284 B2 | 6/2013 | Huang et al. |
| 8,490,092 B2* | 7/2013 | Reuther et al. .......... 718/1 |
| 8,504,686 B2 | 8/2013 | Phaal |
| 8,548,949 B2 | 10/2013 | Jennas, II et al. |
| 8,656,388 B2 | 2/2014 | Chou et al. |
| 8,689,047 B2 | 4/2014 | Kotagiri et al. |
| 8,712,970 B1 | 4/2014 | Sim-Tang |
| 8,782,235 B2 | 7/2014 | Nishiguchi et al. |
| 9,223,607 B2 | 12/2015 | Kar et al. |
| 2003/0014568 A1 | 1/2003 | Kishi et al. |
| 2003/0047057 A1 | 3/2003 | Sasaki |
| 2004/0260726 A1 | 12/2004 | Hrle et al. |
| 2006/0026460 A1 | 2/2006 | Goldberg et al. |
| 2006/0212668 A1 | 9/2006 | Furukawa et al. |
| 2007/0156983 A1 | 7/2007 | Kern et al. |
| 2007/0192765 A1 | 8/2007 | Shimogawa et al. |
| 2008/0162590 A1 | 7/2008 | Kundu et al. |
| 2008/0183922 A1 | 7/2008 | Sampathkumar |
| 2008/0189432 A1* | 8/2008 | Abali et al. .......... 709/238 |
| 2009/0249332 A1* | 10/2009 | Hoehle et al. .......... 718/1 |
| 2009/0328044 A1 | 12/2009 | Bergheaud et al. |
| 2010/0050249 A1 | 2/2010 | Newman |
| 2010/0070725 A1 | 3/2010 | Prahlad et al. |
| 2010/0071025 A1* | 3/2010 | Devine et al. .......... 726/1 |
| 2010/0082922 A1* | 4/2010 | George et al. .......... 711/162 |
| 2010/0107158 A1 | 4/2010 | Chen et al. |
| 2010/0153514 A1 | 6/2010 | Dabagh et al. |
| 2010/0241726 A1 | 9/2010 | Wu |
| 2010/0268816 A1 | 10/2010 | Tarui et al. |
| 2010/0299666 A1 | 11/2010 | Agbaria et al. |
| 2010/0306381 A1 | 12/2010 | Lublin et al. |
| 2010/0318991 A1 | 12/2010 | Venkitachalam et al. |
| 2011/0004935 A1 | 1/2011 | Moffie et al. |
| 2011/0099342 A1 | 4/2011 | Ozdemir |
| 2011/0116185 A1 | 5/2011 | Katagiri et al. |
| 2011/0145471 A1 | 6/2011 | Corry et al. |
| 2011/0197039 A1* | 8/2011 | Green et al. .......... 711/162 |
| 2011/0231839 A1* | 9/2011 | Bennett et al. .......... 718/1 |
| 2011/0302577 A1* | 12/2011 | Reuther et al. .......... 718/1 |
| 2011/0320556 A1* | 12/2011 | Reuther .......... 709/213 |
| 2012/0023493 A1 | 1/2012 | Mori |
| 2012/0109895 A1 | 5/2012 | Zwilling et al. |
| 2012/0151250 A1 | 6/2012 | Saika |
| 2012/0174102 A1 | 7/2012 | Kagan et al. |
| 2013/0024722 A1 | 1/2013 | Kotagiri et al. |
| 2013/0185719 A1 | 7/2013 | Kar et al. |
| 2013/0283092 A1 | 10/2013 | Das et al. |
| 2014/0040572 A1 | 2/2014 | Kotagiri et al. |
| 2014/0208012 A1 | 7/2014 | Kotagiri et al. |
| 2014/0344809 A1 | 11/2014 | Jin et al. |
| 2016/0085837 A1 | 3/2016 | Kotagiri et al. |

OTHER PUBLICATIONS

Bradford, et al., "Live Wide-Area migration of virtual machines including local persistent state", Retrieved at <<http://www-users.cselabs.umn.edu/classes/Fall-2009/csci8980-virtual/papers/live-wan-migration-bradford-vee07.pdf>>, International Conference on Virtual Execution Environments (Co-Located with FCRC 2007 Conference), Jun. 13-15, 2007, pp. 169-179.

Clark, et al., "Live migration of virtual machines", Retrieved at <<http://www.cl.cam.ac.uk/research/srg/netos/papers/2005-migration-nsdi-pre.pdf>>, In proceedings NSDI'05 Proceedings of the 2nd conference on Symposium on Networked Systems Design & Implementation, vol. 2, 2005, pp. 14.

Li, et al., "HyperMIP: Hypervisor controlled mobile IP for virtual machine live migration across networks", Retrieved at <<http://ieeexplore.ieee.org/stamp/stamp.jsp?tp=arnumber=4708866>>, 11th IEEE High Assurance Systems Engineering Symposium, Dec. 3-5, 2008, pp. 80-88.

Luo, et al., "Live and Incremental Whole-System Migration of Virtual Machines Using Block-Bitmap", Retrieved at <<http://www.cs.mtu.edu/~zlwang/papers/cluster08.pdf>>, IEEE International Conference on Cluster Computing, Sep. 29, 2008, pp. 8.

Travostino, et al., "Seamless live migration of virtual machines over the MAN/WAN", Retrieved at <<http://www.francotravostino.name/papers/VMT.pdf>>, Future Generation Computer Systems—IGrid 2005: The global lambda integrated facility, vol. 22, No. 8, Oct. 2006, pp. 1-10.

Voorsluys, et al., "Cost of virtual machine live migration in clouds: A performance evaluation", Retrieved at <<http://citeseerx.ist.psu.edu/viewdoc/download?doi=10.1.1.155.1887&rep=rep1&type=pdf>>, Science, vol. 5931, 2009, pp. 1-12.

Watanabe, et al., "A performance improvement method for the global live migration of virtual machine with IP mobility", Retrieved at <<http://www.icmu.org/icmu2010/Papers/7-3.pdf>>, Proceedings of 5th International Conference on Mobile Computing and Ubiquitous Networking, Apr. 26-28, 2010, pp. 6.

Clark et al.; Live Migration of Virtual Machines; 2005; 14 pages.

Migrate a Virtual Machine to a New Host and Datastore by Using vMotion in the vSphere Web Client; 2012; 3 pages.

Migrating Virtual Machines in the vSphere Client; 2012; 1 page.

Virtual Machine Migration Comparison: VMWare VSphere vs. Microsoft Hyper-V; Oct. 2011; 36 pages.

"Application Consistent Snapshot Backups", Retrieved Date: Mar. 24, 2011, pp. 2.

"Citrix XenServer and NetApp Storage Best Practices", May 2010, pp. 1-104.

"Oracle Database High Availability Features and Products", Retrieved Date: Mar. 24, 2011, Pages 51.

"Second-generation CDP", Oct. 12, 2008, pp. 14.

Final Office Action dated Sep. 18, 2015 in U.S. Appl. No. 14/221,290, 7 pages.

Howard, John S., "Online Backups Using the VxVM Snapshot Facility", Sep. 2000, Pages 7.

Non-Final Office Action dated Dec. 10, 2015 in U.S. Appl. No. 14/221,290, 7 pages.

Non-Final Office Action dated Jul. 9, 2013 in U.S. Appl. No. 13/188,480, 17 pages.

Non-Final Office Action dated May 11, 2015 in U.S. Appl. No. 14/221,290, 10 pages.

Notice of Allowance dated Feb. 12, 2016 in U.S. Appl. No. 14/221,290, 5 pages.

Notice of Allowance dated Nov. 8, 2013 in U.S. Appl. No. 13/188,480, 7 pages.

PowerVC Standard Edition 1.2.2; Migration Requirements; Oct. 2014; 2 pages.

Virtual Machine Migration: NSRC; 2014; 26 pages.

(56) References Cited

OTHER PUBLICATIONS vMotion; Sep. 10, 2015; 6 pages.
Notice of Allowance dated May 18, 2016 in U.S. Appl. No. 14/221,290, 8 pages.
"EMC Recover Point/SE for the CLARiiON CX4", in EMC White Paper, Feb. 2010, 19 pages.
"International Search Report and Written Opinion", Application No. PCT/US2015/051293, dated Jan. 20, 2016, 13 pages.
"Introduction to VMware vSphere Replication", In Technical White Paper, Sep. 15, 2012, 10 pages.
Final Office Action dated Apr. 21, 2015 in U.S. Appl. No. 13/564,449, 8 pages.
Final Office Action dated Feb. 22, 2016 in U.S. Appl. No. 13/564,449, 8 pages.
Interview Summary dated Jul. 28, 2015 in U.S. Appl. No. 13/564,449, 3 pages.
Laverick,"Administering VMware Site Recovery Manager 5.0: Configuring the Protected Site", Available at: http://www.pearsonitcertification.com/articles/article.aspx?p=1828678&seqNum=5, Feb. 28, 2012, 6 pages.
Mohan, et al., "ARIES: a transaction recovery method supporting fine-granularity locking and partial rollbacks using write-ahead logging", Retrieved at <<http://jloxim.mimuw.edu.pl/redmine/projects/jloxim/repository/revisions/2314/raw/trunk/docs/knowledge/log/10.1.1.109.2480-Aries-write-ahead-logging.pdf>>, Proceedings of ACM Transactions on Database Systems, vol. 17, No. 1, Mar. 1992, pp. 94-162.
Narayanan, et al., "Migrating Server Storage to SSDs: Analysis of Tradeoffs", Retrieved at http://citeseerx.ist.psu.edu/viewdock/download?doi=10.1.1.150.2362&rep=rep1&type=pdf>>, Proceedings of the 4th ACM European conference on Computer systems, Apr. 1, 2009, pp. 145-158.
Non-Final Office Action dated Aug. 21, 2015 in U.S. Appl. No. 13/564,449, 8 pages.
Non-Final Office Action dated Jul. 28, 2016 in U.S. Appl. No. 13/564,449, 9 pages.
Non-Final Office Action dated Oct. 9, 2014 in U.S. Appl. No. 13/564,449, 8 pages.
Sharma, "A Practical Guide to Microsoft Hyper-V Replica", Available at: https://www.simple-talk.com/sysadmin/virtualization/a-practical-guide-to-microsoft-hyperv-replica-part-i/, Jun. 10, 2013, 24 pages.
Shenoy, "Making Microsoft Sync Framework Work with PostgreSql", Available at: http://www.infoq.com/articles/Microsoft-Sync-Framework-PostgreSql, Mar. 18, 2011, 17 pages.
Siebert, "A look at VMware vSphere Replication for Site Recovery Manager 5", Available at: http://searchdisasterrecovery.techtarget.com/tip/A-look-at-VMware-vSphere-Replication-for-Site-Recovery-Manager-5, Sep. 24, 2011, 5 pages.
Final Office Action dated Apr. 23, 2014 in U.S. Appl. No. 13/351,487, 14 pages.
Final Office Action dated May 20, 2015 in U.S. Appl. No. 13/351,487, 15 pages.
Mashtizadeh et al., "The Design and Evolution of Live Storage Migration in VMware ESX," Jun. 2011, retrieved at <<http://www.usenix.org/events/atc11 /tech/final_files/Mashtizadeh.pdf, pp. 1-14.
Non-Final Office Action dated Jan. 31, 2014 in U.S. Appl. No. 13/351,487, 12 pages.
Non-Final Office Action dated Oct. 22, 2014 in U.S. Appl. No. 13/351,487, 14 pages.
Notice of Allowance dated Aug. 28, 2015 in U.S. Appl. No. 13/351,487, 8 pages.
Zheng et al., "Workload-Aware Live Storage Migration for Clouds," Proceedings: 7th ACM SIGPLAN/SIGOPS international conference on Virtual execution environments, Mar. 9-11, 2011, retrieved at <<http://www.cs.rice.edu/~eugeneng/papers/VEE11.pdf>>, 12 pages.
Final Office Action dated Dec. 29, 2016 in U.S. Appl. No. 14/221,290, 18 pages.
"International Search Report & Written Opinion Issued in PCT Application No. PCT/US2015/051293", dated Jul. 15, 2016, 7 Pages.
Joyce Fee: OracleS™ Administrator's Guide Release 8.0, Dec. 1997, Oracle®.
Non-Final Office Action dated Oct. 19, 2016 in U.S. Appl. No. 14/495,685, 22 pages.
Final Office Action dated Mar. 28, 2017 in U.S. Appl. No. 14/495,685, 23 pages.
Final Office Action dated Jun. 6, 2017 in U.S. Appl. No. 14/221,290, 28 pages.

* cited by examiner

COMBINED LIVE MIGRATION AND STORAGE MIGRATION USING FILE SHARES AND MIRRORING

CROSS-REFERENCE TO RELATED APPLICATION(S)

This application is a continuation of U.S. patent application Ser. No. 13/177,432, filed Jul. 6, 2011, now U.S. Pat. No. 8,490,092, entitled "COMBINED LIVE MIGRATION AND STORAGE MIGRATION USING FILE SHARES AND MIRRORING". The entirety of this afore-mentioned application is incorporated herein by reference.

BACKGROUND

A software implementation of a computing device is called a virtual machine. A virtual machine executes programs like a physical computing device. Virtual peripheral devices of the virtual machine may differ from physical peripheral devices of a physical computing device upon which the virtual machine executes. For example, a virtual machine may have a given number of virtual disks, while the physical computing device upon which the virtual machine executes may have a different number of physical disks, or no physical disks. Similarly, an operating system of a virtual machine may differ from an operating system of the physical computing device on which the virtual machine executes. In addition, a single physical computing device may have a number of virtual machines executing thereon.

A virtualization platform executes on a physical computing device and provides an infrastructure in which virtual machines can execute. The virtualization platform provides virtual devices to the virtual machines, manages resources of the virtual machines and a physical computing device on which the virtual machines execute, and manages application program interfaces (APIs) for the virtual machines, as well as performing other functions.

A process of moving a virtual machine from a first physical computing device, which currently executes the virtual machine (a source host), to a second physical computing device (a destination host) is called live migration. In this specification, the term "live migration" refers to a moving of an executing, or running, virtual machine from a source host to a destination host. One common implementation of live migration includes establishing a network connection between a first virtualization platform of the source host and a second virtualization platform of the destination host. A runtime state (including, but not limited to, a memory of a virtual machine, a state of virtual processors of the virtual machine and a state of virtual devices of the virtual machine) of the virtual machine executing within the first virtualization platform may be transferred to the second virtualization platform via the established network connection. In some implementations, the network connection may be a transmission control protocol (TCP) connection. However, other types of network connections are also possible.

A live migration moves the virtual machine from the first physical computing device to the second physical computing device. However, it is commonly understood that files used by the virtual machine are not moved during the live migration. As a result, the files used by the virtual machine, which may include, but not be limited to, virtual hard disk (VHD) files, are stored in some form of shared storage such that the first virtualization platform at the first physical computing device and the second virtualization platform at the second physical computing device both have access to the files used by the virtual machine. The shared storage may include, but not be limited to, a storage area network (SAN), a file share including, but not limited to, a server message block (SMB) or a network file system (NFS), or another form of shared storage accessible to the first physical computing device and the second physical computing device.

Typically, a live migration is performed in two phases, a "brownout phase" and a "blackout phase". During the brownout phase, the first virtualization platform on the first physical computing device, or the source host, sets up a copy of the virtual machine on the second physical computing device, or the destination host while the virtual machine executes on the first physical computing device. In order to minimize a duration of the blackout phase, during the brownout phase, the live migration usually tracks changes to the runtime state of the executing virtual machine and potentially transfers, from the first virtualization platform to the second virtualization platform, a portion of the runtime state that changed in order to reduce a size of any remaining runtime state changes to be performed before leaving the blackout phase.

During the "blackout phase", the virtual machine executing on the first virtualization platform is stopped (or paused), ownership of the virtual machine is transferred to the second virtualization platform, and the virtual machine is restored and started (or resumed) on the second virtualization platform. Only a small remaining portion of the runtime state is transferred to the second virtualization platform during the blackout phase.

A storage migration is a process in which files used by a virtual machine in a virtualization platform are moved from a current storage location (a source location) to another storage location (a destination location). The files may include, but not be limited to, VHD files and configuration files which store settings of a virtual machine. One common implementation of storage migration for a running virtual machine includes a "mirroring" phase, during which all disk write operations performed by the virtual machine are performed with respect to virtual disk files at the source location and at the destination location. After a complete copy of the virtual disk files from the source location is created at the destination location, the virtual machine is switched over to use only the virtual disk files at the destination location and the virtual disk files in the source location may be deleted. Storage migration does not move the virtual machine. Only the storage location of the files used by the virtual machine is changed. Therefore, one limitation of source migration is that the source location and the destination location are both accessible from the virtual machine.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a virtualization platform at a source host (source virtualization platform) may receive a request to perform a virtual machine migration of a virtual machine running at the source host to a destination host. The source host and the destination host may not have access to a commonly shared storage system. Responsive to the request, the source virtualization platform may initiate creation of a temporary network file share at one or more destination locations at the destination host, such that the network file share is accessible by the source host and the destination host. The source virtualization platform may then perform a storage migration of files, used by the virtual machine at the source host, to the one or more destination locations at the destination host via a network and the created network file share.

After successfully creating files, at the one or more destination locations, corresponding to the files used by the virtual machine, the virtual machine may enter a mirror state, such that disk operations to files used by the virtual machine at the source host are also performed with respect to corresponding files created at the destination host.

The source virtualization platform may begin a live migration of the virtual machine at the source host to the destination host, such that at least a portion of a runtime state of the virtual machine at the source host is copied to a memory at the destination host. During a final phase of the live migration and the storage migration, the virtual machine at the source host may be stopped (or paused), the mirror state may be canceled, thereby stopping a mirroring operation, a remaining portion of the runtime state may be copied to the memory of the destination host, and the migrated virtual machine at the destination host may be started (or resumed) on a destination virtualization platform of the destination host.

In some embodiments, in order to perform the live migration, the source host may establish a network connection with the destination host and may provide a runtime state of the virtual machine, at the source host, to the destination host via the network connection. In some implementations, the network connection may be a transmission control protocol (TCP) connection. In other implementations, other types of network connections may be employed. The destination host may receive the runtime state and may restore the runtime state to a memory of the destination host.

In other embodiments, the runtime state may be provided to the destination host in a different manner. For example, the virtualization platform at the source host may copy the runtime state to one or more files, which we refer to as saved-state files, on the file share.

DRAWINGS

In order to describe the manner in which the above-recited and other advantages and features can be obtained, a more particular description is described below and will be rendered by reference to specific embodiments thereof which are illustrated in the appended drawings. Understand that these drawings depict only typical embodiments and are not therefore to be considered to be limiting of its scope. Implementations will be described and explained with additional specificity and detail through the use of the accompanying drawings.

DETAILED DESCRIPTION

Overview

Existing solutions for performing a live migration and a storage migration do not provide for moving a complete virtual machine from a first physical computing device to a second physical computing device when the first physical computing device and the second physical computing device do not have access to a commonly shared storage system.

Various embodiments consistent with the subject matter of this disclosure leverage an ability of storage migration to move files used by a virtual machine, executing on a first physical computing device (source host), to a temporary network file share, which may be created on a second physical computing device (destination host), and an ability of a live migration to move a runtime state of the virtual machine from the source host to the destination host.

While the virtual machine is executing on the source host, a virtual machine migration may be initiated. A source virtualization platform, executing on the source host, may initiate creation of a temporary network file share at one or more destination storage location at the destination host. The temporary network file share may be accessible by both the source host and the destination host.

A source virtualization platform executing on the source host may perform a storage migration of files used by the virtual machine from source storage locations at the source host to destination storage locations at the destination host by using the temporary network file share. During the storage migration, a mirror state for the virtual disks may be maintained. While in the mirror state, disk write operations by the virtual machine at the source host are written to files of virtual disks at the source storage location and files of virtual disks at the one or more destination storage locations.

The virtualization platform at the source host may perform a live migration of the virtual machine from the source host to the destination host. The live migration transfers a runtime state of the virtual machine from the source host to the destination host. In a final phase of live migration, the virtual machine at the source host is stopped (or paused), ownership of the virtual machine is transferred from the source host to the destination host, the mirror state is canceled (a mirroring operation is stopped), and the virtual machine is resumed (or started) on the destination host and is configured to use the virtual disk files at the one or more destination locations of the destination host.

After the virtual machine migration is completed, the temporary network file share at the destination host may be closed, virtual machine resources at the source host may be released, and the files used by the virtual machine on the source host may be deleted.

Exemplary Operating Environment

Figure 1:
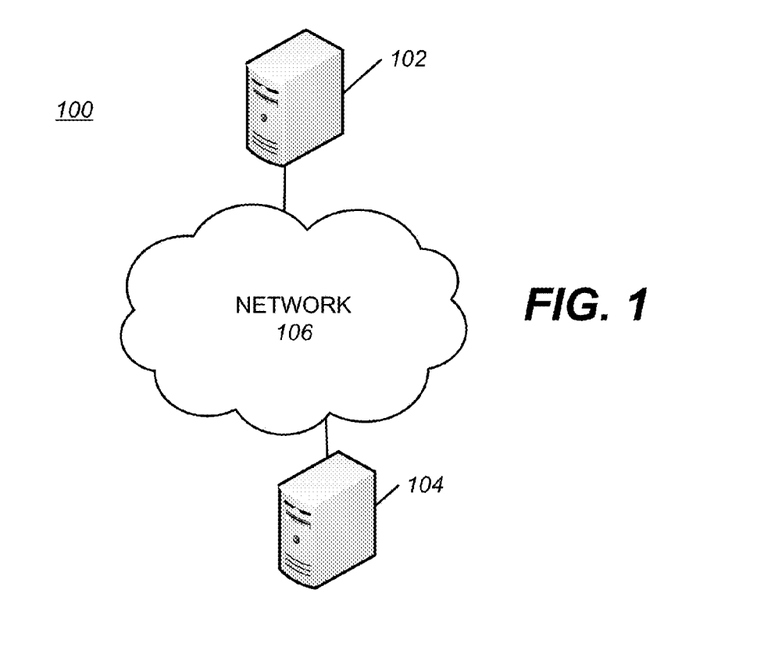
FIG. 1 illustrates an exemplary operating environment in which various embodiments may be implemented.

FIG. 1 illustrates an exemplary operating environment 100 in which various embodiments consistent with the subject matter of this disclosure may be implemented. Operating environment 100 may include a source host 102, a destination host 104 and a network 106. Source host 102 and destination host 104 may each be a physical computing device upon which a virtual machine may execute on a virtualization platform. Network 106 may include one or more networks of various types, including, but not limited to a private corporate network, a public network, a packet switching network, the Internet, a fiber optic network, a wireless network, or other types of networks.

Exemplary Processing Devices

Figure 2:
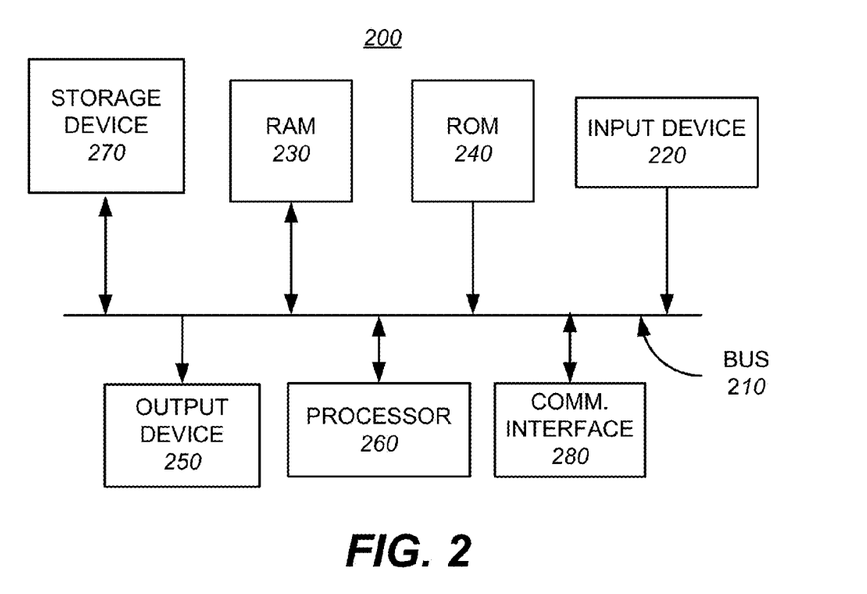
FIG. 2 is a block diagram of an exemplary computing device which may be used as a source host or a destination host.

FIG. 2 is a block diagram of an exemplary computing device 200, which may be used to implement embodiments of source host 102 and/or destination host 104. Computing device 200 may be a server, a personal computer (PC), or another type of computing device. Computing device 200 may include hardware, such as a processor 260, a bus 210, a memory, which may include a combination of random access memory (RAM) 230 and read only memory (ROM) 240, a storage device 270, an input device 220, an output device 250 and a communication interface 280.

Processor 260 may include one or more conventional processors that interpret and execute instructions. RAM 230, ROM 240, and/or another type of dynamic or static storage medium, respectively, may store information and instructions for execution by processor 220. RAM 230, or another type of dynamic storage medium, may store instructions as well as temporary variables or other intermediate information used during execution of instructions by processor 220. ROM 240, or another type of static storage medium, may store static information and instructions for processor 260. Some embodiments of computing device 200 may further include a hardware logic component, including, but not limited to, an application specific integrated circuit (ASIC) (not shown) and/or a field programmable gate array (FPGA) (not shown) that may be combined with instructions in memory 230, 240 to cause computing device 200 to perform a method.

Input device 220 may include a keyboard, a pointing device, or other device for providing input. Output device 250 may include a display, a printer, or other device for outputting information. Communication interface 280 may include a transceiver for sending and receiving information via network 106.

Storage device 270 may include a machine-readable storage medium such as, for example, a magnetic disk, a writable optical disc, a flash RAM device, or other type of machine-readable storage media for storing data, instructions, or other information. Non-limiting examples of storage device 270 may also include Digital Video Disk (DVD), compact Disk (CD), or other types of storage devices using other types of machine-readable storage media for storing data and/or instructions for later use.

Computing device 200 may communicate with other devices via a communication medium, which may include, but not be limited to a propagated signal on a carrier wave and may perform functions in response to processor 260 executing sequences of instructions contained in a machine-readable storage medium. Such instructions may be read into a machine-readable storage medium, including, but not limited to, RAM 230 from another machine-readable storage medium or from a separate device via communication interface (280).

Embodiments

Figure 3:
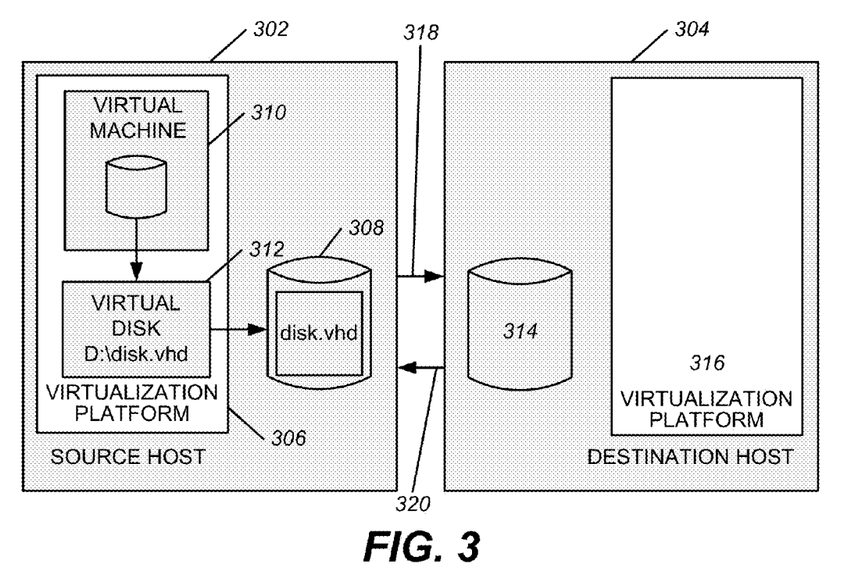
FIGS. 3-5 show the source host and the destination host at various stages of a virtual machine migration.
Figure 4:
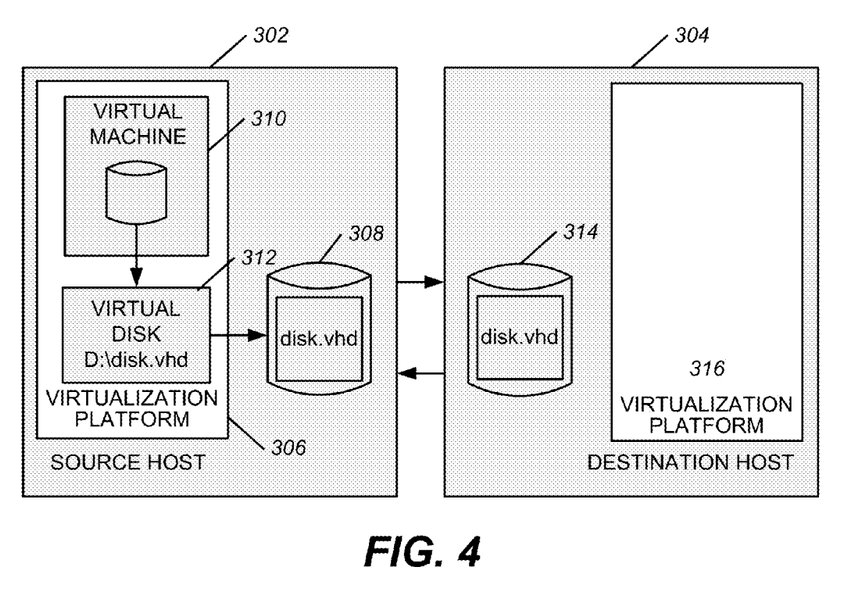
Figure 5:
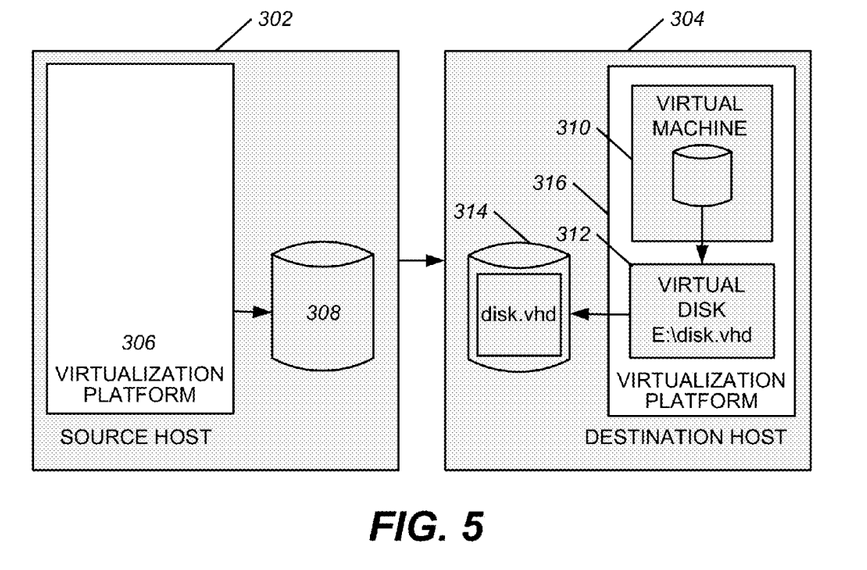

FIGS. 3-5 illustrate various stages of an exemplary process for virtual machine migration. FIG. 3 shows a source host 302 and a destination host 304 capable of communicating with one another through a network or a combination of networks. Source host 302 may include a virtualization platform 306 and a storage device, such as, for example, a disk 308, which, in this example, source host 302 may address as "D:". Virtualization platform 306 may execute virtual machine 310 having a virtual disk 312, which, in this example, is actually a file called disk.vhd residing on disk 308. Destination host 304 may include a disk 314 and a virtualization platform 316.

A virtual machine migration of virtual machine 310 may be initiated in a number of ways, including, but not limited to a client calling an application program interface (API). When a client calls an API on source host 302 to initiate the virtual machine migration, the client may provide an identifier of a destination host and one or more identifiers of one or more storage locations at destination host 316. The identifier of the destination host may include, but not be limited to, a domain name system (DNS) name or an internet protocol (IP) address.

Upon initiation of the virtual machine migration, source host 302 may send a request 318 for a network file share to destination host 304. In some implementations, destination host 304 may create the network file share and may respond to source host 302 with a location of the network file share 320. In this example, the network file share is created on disk 314, which may be addressed by destination host 304 as "E:" See FIG. 5.

FIG. 4 illustrates a storage migration process in which virtualization platform 306 at source host 302 may copy files used by virtual machine 310 to the one or more destination storage locations at destination host 304. FIG. 4 shows virtualization platform 306 copying a virtual disk file, disk.vhd, from disk 308 to disk 314 at destination host 304, while virtual machine 310 is running on virtualization platform 306. Virtualization platform 306 may enter a mirror state in which all disk write operations by virtual machine 310 to files of virtual machine 310 may be mirrored or performed by virtualization platform 306, with respect to corresponding files at the one or more destination locations, which in this example is disk 314.

Virtualization platform 306 may start performing a live migration process while virtual machine 310 is running on virtualization platform 306 of source host 302. At least some of the live migration process may be performed while the storage migration process is also being performed. For example, the live migration process may be performed while the storage migration process mirrors disk write operations to files used by virtual machine 310. During the live migration process, virtualization platform 306 of source host 302 may copy a runtime state of virtual machine 310 to destination host 304. The running state of virtual machine 310 may include, but not be limited to, a content of a memory of virtual machine 310 and a state of virtual processors and virtual devices of virtual machine 310.

FIG. 5 illustrates source host 302 and destination host 304 after a final phase of virtual machine migration. In the final phase, virtual machine 310 of source host 302 may enter a blackout phase in which virtualization platform 306 stops (or pauses) virtual machine 310. Virtualization platform 306 may then cause virtual machine 310 to cancel the mirror state such that disk write operations by virtual machine 310 are no longer mirrored to corresponding files at destination host 304. By the time the mirroring is stopped, virtual machine 310 is paused and files used by virtual machine 310 and corresponding files at the one or more destination locations are identical. Source host 302 may then inform destination host 304 to close the network file share on disk 314 and start (or resume) virtual machine 310 in virtualization platform 316 of destination host 304, such that virtual machine 310 in virtualization platform 316 starts (or resumes) in a same running state as was virtual machine 310 when last running in virtualization platform 306. Virtual machine 310 in virtualization platform 316 is configured to use virtual machine files migrated from disk 308 to disk 314, in this example. After virtual machine 310 is successfully started (or resumed) in virtualization platform 316, virtualization platform 306 at source host 302 may release virtual machine resources previously used by virtual machine 310 at source host 302. The releasing of virtual machine resources may include deletion of files previously used by virtual machine 310 at source host 302 and stored on disk 308.

Figure 6:
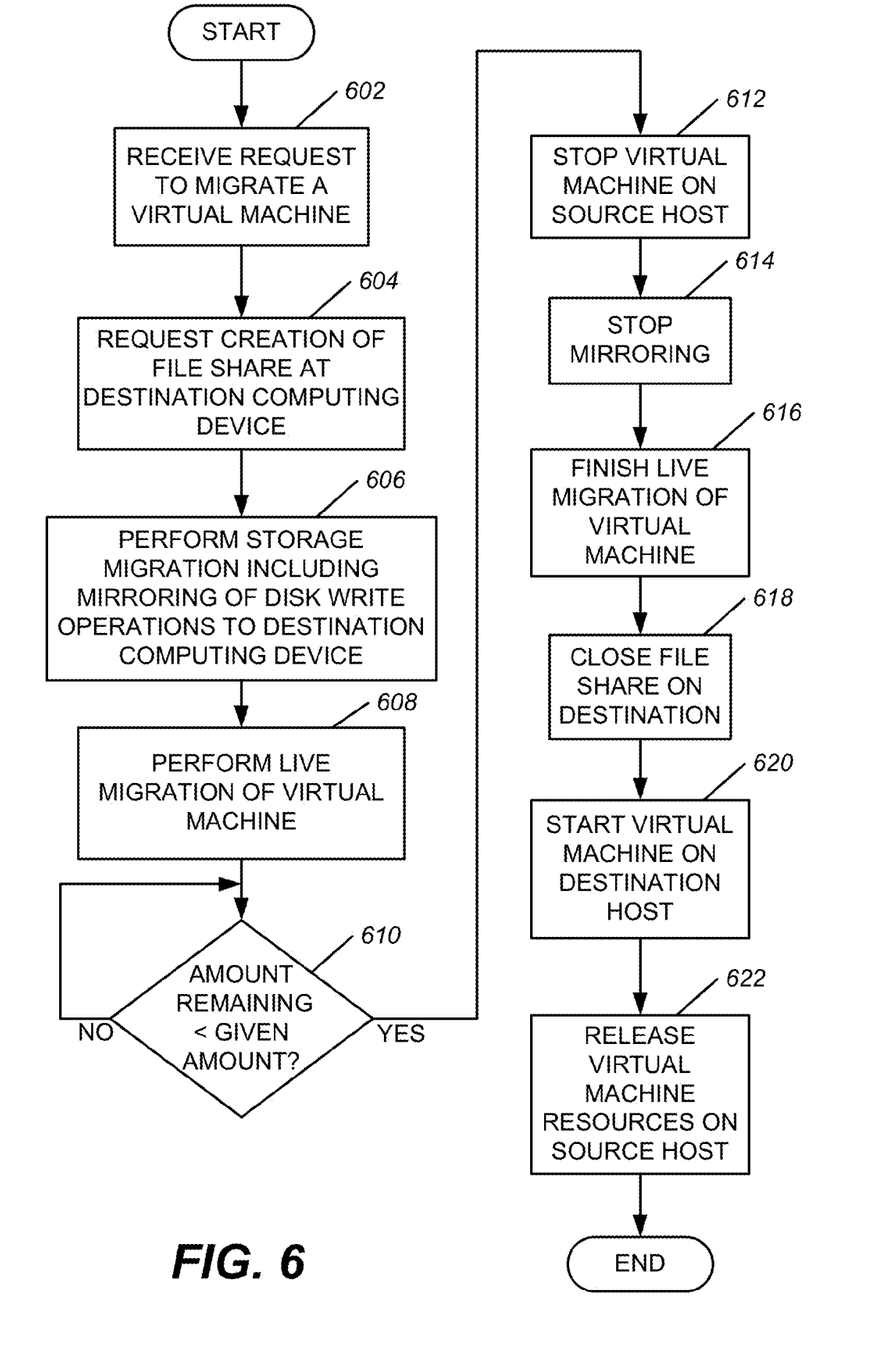
FIGS. 6-10 are flowcharts illustrating exemplary processing in a number of embodiments and variations of embodiments consistent with the subject matter of this disclosure.

FIG. 6 is a flowchart illustrating an exemplary process for performing a virtual machine migration in various embodiments. The process may begin with a virtualization platform on a source host receiving a request to migrate a virtual machine, executing on the source host, to a destination host (act 602). In some embodiments, a client, executing on the source host or different computing device, may call an API to request a virtual machine migration to the destination host. The call may include an identifier of the destination host and an identifier of one or more storage locations at the destination host for storing virtual machine files.

Next, the virtualization platform at the source host may send a request, via one or more networks connecting the source host and the destination host, for creation of a network file share at the one or more storage locations at the destination host (act 604). In some embodiments, the destination host may receive the request, may create a network file share, and may send an indication of a location of the network file share to the virtualization platform at the source host. In other embodiments, the virtualization platform at the source host may establish a network connection with the destination host and may use a custom protocol to request creation of the network file share. In further embodiments, the virtualization platform at the source host may use remote management capabilities of the destination host to create the network file share. The remote management capabilities may include Windows Management Instrumentation (WMI), within the Microsoft® Windows® operating system, or other facility for providing remote management capabilities. The destination host may create the network file share using WinAPI (Windows® API), which is Microsoft Corporation's core set of application programming interfaces (APIs) available in the Microsoft® Windows® operating systems.

Next, the virtualization platform of the source host may start a storage migration process to migrate files, used by the virtual machine executing on the virtualization platform of the source host, to the one or more destination locations while the virtual machine is running at the source host (act 606). During the storage migration process, the virtualization platform may place the virtual machine in a mirror state such that disk write operations to a virtual machine file by the virtual machine are mirrored by the virtualization platform to corresponding files at the one or more destination locations at the destination host.

Figure 7:
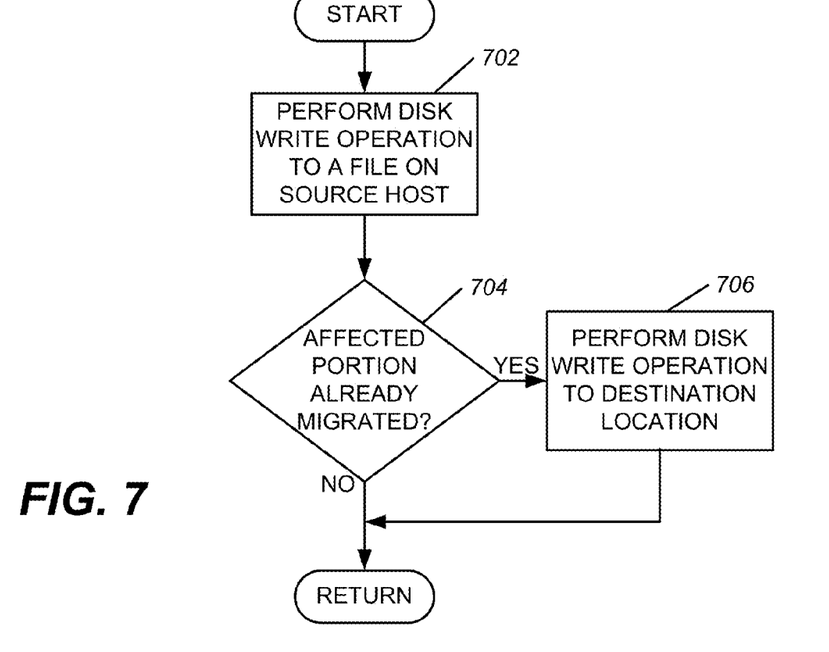

FIG. 7 is a flowchart illustrating exemplary processing with respect to mirroring disk write operations by the virtualization platform at the source host. The process may begin with the virtual machine, executing within the virtualization platform at the source host, performing a disk write operation to a virtual machine file at the source host (act 702). The virtualization platform may determine whether the disk write operation is to a portion of the virtual machine file that has already been migrated to one of the one or more destination storage locations (act 704).

If the virtualization platform determines that an affected portion of the virtual machine file has not already been migrated, then the process is complete. In other words, the virtual machine may perform the disk write operation to the virtual machine file at the source host and the affected portion of the virtual machine file will eventually be migrated to the one of the one or more destination storage locations as a result of the storage migration.

If, during act 704, the virtualization platform determines that the affected portion of the virtual machine file was migrated to the one of the one or destination storage locations, then the virtualization platform may perform the disk write operation to a corresponding file at the one of the one or more destination storage locations (act 706).

Returning to FIG. 6, the virtualization platform at the source host may begin live migration of the virtual machine at the source host while the virtual machine is running at the source host (act 608).

Figure 8:
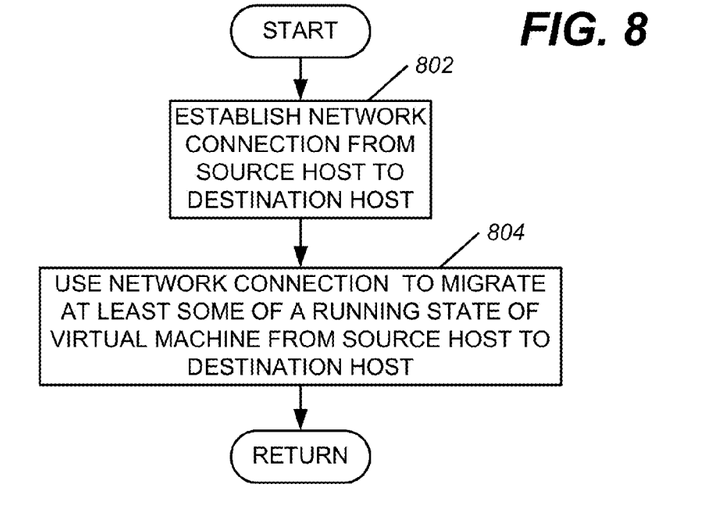

FIG. 8 is a flowchart illustrating an exemplary process, in an embodiment, for beginning the live migration of the virtual machine at the source host. The process may begin with the virtualization platform, executing at the source host, establishing a network connection to the destination host (act 802). In some implementations of the embodiment, the virtualization platform may establish a transmission control protocol (TCP) connection to the destination host. In particular, in some of the implementations, the virtualization platform may establish the TCP connection to a virtualization platform executing at the destination host. In other embodiments, a different type of network connection may be established.

Next, the virtualization platform at the source host may migrate at least some of the running state of the virtual machine from the source host to the destination host via the network connection (act 804). In some implementations, the virtualization platform at the source host may migrate the running state to the virtualization platform at the destination host, which may restore the running state to a memory of the destination host.

Figure 9:
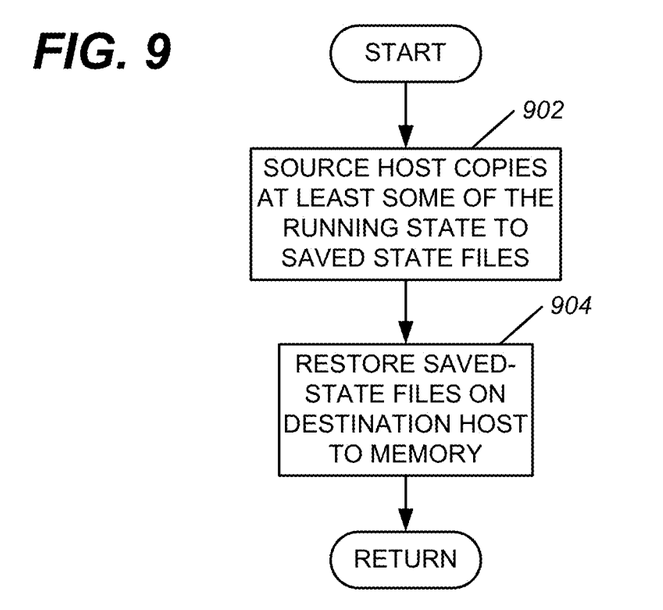

Of course, in other embodiments, implementations may employ other methods for migrating the running state to the destination host. As an example, FIG. 9 illustrates an exemplary process, in a different embodiment, for migrating the running state to the destination host. The process may begin with the virtualization platform at the source host copying at least some of the running state to one or more saved-state files at the one or more destination storage locations (act 902). The destination host, or the virtualization platform executing at the destination host, may then restore contents of the one or more saved-state files to a memory of the destination host (act 904).

Returning to FIG. 6, the virtualization platform at the source host may determine whether an amount of the running state to be copied to the destination host during the live migration is less than a given amount (act 610). If the virtualization platform at the source host determines that the amount is not less than the given amount, then the virtualization platform at the source host may remain performing the live migration and the storage migration. Otherwise, the virtualization platform at the source host may pause (or stop) the virtual machine at the source host, thereby entering a blackout phase (act 612), may stop mirroring by canceling the mirror state (act 614), and may finish live migration of the virtual machine by copying a remaining amount of the running state to the destination host (act 616), which may restore the remaining amount of the running state to the memory of the destination host. The copying of the remaining amount of the running state to the destination host may, in effect, transfer ownership of the virtual machine from the virtualization platform at the source host to the virtualization platform at the destination host. The network file share at the destination host may then be closed (act 618) and the virtual machine in the virtualization platform at the destination host may be started (or resumed) and may be configured to use the virtual machine files migrated to the one or more destination storage locations (act 620). The virtualization platform at the source host may then release resources previously used by the virtual machine at the source host (act 622). The releasing of the resources may include, but not be limited to, deletion of virtual machine files previously used by the virtual machine at the source host and releasing of memory resources previously used by the virtual machine at the source host.

Figure 10:
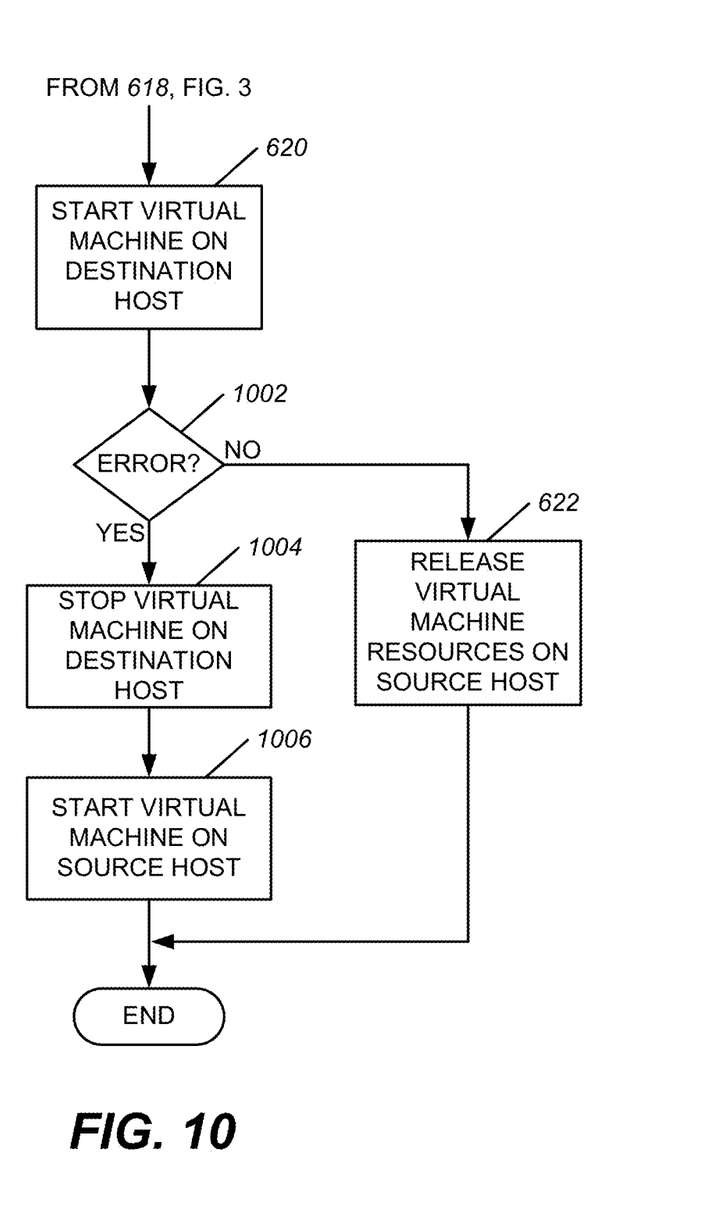

FIG. 10 is a flowchart illustrating an exemplary variation of the process shown in FIG. 6. The flowchart of FIG. 10 shows changes with respect to the flowchart of FIG. 6. That is, acts 602-618 may be performed as previously described with respect to FIG. 6. After performing act 618, the virtual machine at the destination host may be started (or resumed) (act 620). The virtualization platform at the destination host may determine whether the virtual machine started correctly or whether errors occurred (act 1002). If no errors occurred, then the virtualization platform at the source host may be informed that the virtual machine started correctly at the destination host and the virtualization platform at the source host may release resources previously used by the virtual machine at the source host (act 622).

If, during act 1002, the virtualization platform at the destination host determines that the virtual machine at the destination host did not start correctly and one or more errors occurred, then the virtualization platform at the destination host may stop the virtual machine at the destination host and may inform the virtualization platform at the source host that the virtual machine at the destination host did not start correctly (act 1004). The virtualization platform at the source host may then start (or resume) the virtual machine at the source host, which may use the virtual machine files at the source storage location (act 1006). Thus, in this variation of the embodiment of FIG. 6, if the virtual machine at the destination host does not start properly after a virtual machine migration then the virtual machine at the source host may again be started (or resumed), thereby minimizing downtime of the virtual machine.

CONCLUSION

Embodiments consistent with the subject matter of this disclosure perform a virtual machine migration to move a virtual machine and associated files between hosts that may not have access to a common shared storage system. Further, in various embodiments, if the migrated virtual machine at the destination host fails to start (or resume) properly then the virtual machine at the source host may again be started (or resumed) in order to reduce an amount of downtime.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims. Further, the acts described by FIGS. 6-10 may be performed in a different order in other embodiments.

Accordingly, the appended claims and their legal equivalents define embodiments, rather than any specific examples given.

We claim as our invention:

1. A computing device implemented method for migrating a virtual machine executing on a source virtual machine host device to a destination virtual machine host device, the method comprising:
    migrating, while the virtual machine is running on the source virtual machine host device, at least a portion of one or more files associated with the virtual machine from a source data store of the source virtual machine host device to a destination data store of the destination virtual machine host device, including:
        copying, by the source virtual machine host device, at least the portion of the one or files associated with the virtual machine from the source data store to the destination data store, the destination data store being temporarily accessible to both the source virtual machine host device and the destination virtual machine host device for migration of at least the portion of the one or more files associated with the virtual machine; and
        mirroring write operations on at least the portions of the one or files associated with the virtual machine on the source data store to at least the portions of the one or more files associated with the virtual machine on the destination data store;
    migrating, at least partially while the write operations are being mirrored to the destination data store, the virtual machine from the source virtual machine host device to the destination virtual machine host device, including:
        stopping, or pausing, the running of the virtual machine on the source virtual machine host device; and
        stopping the mirroring of write operations on at least the portions of the one or more files associated with the virtual machine; and
    initiating start-up of the virtual machine on the destination virtual machine host device from the one or more files associated with the virtual machine that were migrated to the destination data store.

2. The method of claim 1, wherein the migration of the virtual machine from the source virtual machine host device to the destination virtual machine host device is a live migration.

3. The method of claim 1, wherein migrating at least the portion of the one or more files includes:
    initiating, by the source virtual machine host device, sharing of the destination data store of the destination virtual machine host device with the source virtual machine host device.

4. The method of claim 1, wherein:
    the method further comprises receiving, by the source virtual machine host device, a request to migrate the virtual machine to the destination virtual machine host device;
    the migration of at least the portion of the one or more files associated with the virtual machine is in response to the received request; and
    the migration of the virtual machine is in response to the received request.

5. The method of claim 1, wherein the method further comprises:
    receiving, by the source virtual machine host device, an indication that the virtual machine was successfully started on the destination virtual machine host device; and in response to the indication, releasing resources of the source virtual machine host device allocated to the virtual machine.

6. The method of claim 1, wherein mirroring the write operations, includes:
performing a write operation to a source file of the source data store of the source virtual machine host device;
determining that the write operation is to a portion of the source file that has been copied to a destination file of the destination data store of the destination virtual machine host device; and
performing, in response to the determination, a corresponding write operation on the destination file of the destination data store of the destination virtual machine host device.

7. The method of claim 1, wherein the method further comprises:
copying at least a portion of a running state of the virtual machine on the source virtual machine host device to at least one saved-state file of the destination data store of the destination virtual machine host device.

8. The method of claim 7, wherein:
the start-up of the virtual machine on the destination virtual machine host device includes resuming the virtual machine from the at least one saved-state file.

9. The method of claim 1, wherein the one or more files associated with the virtual machine include at least one virtual hard drive file and at least one saved-state file.

10. A machine-readable storage medium, comprising at least one of a memory, a disc, or a disk, having instructions stored therein for performing operations on a source virtual machine host device to migrate a virtual machine to a destination virtual machine host device, the operations comprising:
migrating, by the source virtual machine host device, at least partially while the virtual machine is running on the source virtual machine host device, one or more files associated with the virtual machine from a source data store of the source virtual machine host device to a destination data store of the destination virtual machine host device, the migrating of the one or files including:
at least one copy operation that copies the one or files associated with the virtual machine from the source data store to the destination data store, the destination data store being accessible to both the source virtual machine host device and the destination virtual machine host device during the migration of the one or more files associated with the virtual machine; and
at least one mirrored write operation that mirrors a write operation on a copied file of the one or more files associated with the virtual machine on the source data store to a corresponding file on the destination data store;
migrating, at least partially while write operations are mirrored, the virtual machine from the source virtual machine host device to the destination virtual machine host device, the migrating of the virtual machine including:
an operation that stops, or pauses, execution of the virtual machine on the source virtual machine host device; and
an operation that disables mirrored write operations; and
initiating a start of the virtual machine on the destination virtual machine host device from the one or more files associated with the virtual machine that were migrated to the destination data store.

11. The machine-readable storage medium of claim 10, wherein the operations further comprise:
receiving, by the source virtual machine host device, a request to migrate the virtual machine to the destination virtual machine host device, wherein:
the migrating of the one or more files associated with the virtual machine is in response to the received request;
the migrating of the one or more files includes:
initiating, by the source virtual machine host device, establishment of a share of the destination data store to the source virtual machine host device by the destination virtual machine host device; and
wherein
the migrating of the virtual machine is also in response to the received request.

12. The machine-readable storage medium of claim 10, wherein the operations further comprise:
receiving, by the source virtual machine host device, an indication that the virtual machine was successfully started on the destination virtual machine host device; and
in response to the indication, releasing resources of the source virtual machine host device that are associated with the virtual machine.

13. The machine-readable storage medium of claim 10, wherein the at least one mirrored write operation includes:
performing a write operation to a source file of the source data store of the source virtual machine host device;
determining that the write operation is to a portion of the source file that has been copied to a destination file of the destination data store of the destination virtual machine host device; and
performing, in response to the determination, a corresponding write operation on the destination file of the destination data store of the destination virtual machine host device.

14. The machine-readable storage medium of claim 10, wherein the operations further comprise:
copying at least a portion of a running state of the virtual machine on the source virtual machine host device to at least one saved-state file on the destination data store of the destination virtual machine host device.

15. The machine-readable storage medium of claim 14, wherein:
starting the virtual machine on the destination virtual machine host device includes resuming the virtual machine from the at least one saved- state file.

16. A method for migrating a virtual machine from a source virtual machine host device, the method comprising:
temporarily authorizing the source virtual machine host device to write to a destination data store of a destination virtual machine host device;
receiving on the destination data store, while the virtual machine is running on the source virtual machine host device, one or more files associated with the virtual machine from the source virtual machine host device;
receiving, while the virtual machine is running on the source virtual machine host device, one or more mirrored write operations to the received one or more files;
receiving, after the virtual machine has been stopped or paused on the source virtual machine host device, at least a portion of a saved-state of the virtual machine;

receiving a request from the source virtual machine host device to start the virtual machine on the destination virtual machine host device;

in response to the received request, starting the virtual machine on the destination virtual machine host device; and in response to the received request, deauthorizing the source virtual machine host device's ability write to the destination data store.

17. The method of claim 16, further comprising:
providing, by the source virtual machine host device, an indication to the source virtual machine host device that the virtual machine was successfully started on the destination virtual machine host device, wherein the deauthorizing of the source virtual machine host device's ability write to the destination data store is also in response to the virtual machine on the destination virtual machine host device.

18. The method of claim 16, wherein:
starting the virtual machine includes resuming the virtual machine from at least the received portion of the saved-state of the virtual machine.

19. The method of claim 16, wherein the one or more files associated with the virtual machine include at least one virtual hard drive file.

20. The method of claim 16, further comprising:
receiving a request, from the source virtual machine host device via a remote management interface, to share the destination data store with the source virtual machine host device, wherein the source virtual machine host device is temporarily authorized to write to the destination data store in response to the request to share the destination data store with the source virtual machine host device.

* * * * *